(12) United States Patent
Kerai

(10) Patent No.: US 9,734,480 B2
(45) Date of Patent: Aug. 15, 2017

(54) METHOD AND APPARATUS FOR SECURE ASSET TRACKING

(75) Inventor: Kanji Kerai, Kingsbury (GB)

(73) Assignee: Nokia Technologies Oy, Espoo (FI)

( * ) Notice: Subject to any disclaimer, the term of this patent is extended or adjusted under 35 U.S.C. 154(b) by 1164 days.

(21) Appl. No.: 13/592,396

(22) Filed: Aug. 23, 2012

(65) Prior Publication Data

US 2014/0055243 A1 Feb. 27, 2014

(51) Int. Cl.
*H04Q 5/22* (2006.01)
*G06Q 10/08* (2012.01)

(52) U.S. Cl.
CPC ....... *G06Q 10/0833* (2013.01); *G06Q 10/087* (2013.01); *H04Q 2213/13095* (2013.01)

(58) Field of Classification Search
USPC ........................................................ 340/10.1
See application file for complete search history.

(56) References Cited

U.S. PATENT DOCUMENTS

| 2008/0109302 | A1 | 5/2008 | Salokannel et al. | |
| 2009/0234728 | A1* | 9/2009 | Willuns et al. | 705/14 |
| 2011/0021142 | A1 | 1/2011 | Desai et al. | |
| 2012/0136865 | A1* | 5/2012 | Blom et al. | 707/739 |
| 2012/0178471 | A1 | 7/2012 | Kainulainen et al. | |
| 2013/0109315 | A1* | 5/2013 | Polo et al. | 455/41.2 |

OTHER PUBLICATIONS

International Search Report for corresponding International application No. PCT/IB2013/056796, mailed Jan. 27, 2014, 5 pages.
Written Opinion for corresponding International application No. PCT/IB2013/056796, mailed Jan. 27, 2014, 8 pages.

* cited by examiner

*Primary Examiner* — Omer S Khan
(74) *Attorney, Agent, or Firm* — Ditthavong & Steiner, P.C.

(57) ABSTRACT

An approach is provided for providing a secure and energy efficient method of asset tracking using BLE tags. The security module determines identification criteria associated with at least one scanning device. The security module processes and/or facilitates a processing of the identification criteria to cause, at least in part, a transmission of at least one scan response to the at least one scanning device including, at least in part, asset data associated with at least one tag. The security module causes, at least in part, a modification of one or more advertising packets of the at least one tag based, at least in part, on the transmission of the asset data.

20 Claims, 9 Drawing Sheets

FIG. 1

METHOD AND APPARATUS FOR SECURE ASSET TRACKING

BACKGROUND

Service providers and device manufacturers (e.g., wireless, cellular, etc.) are continually challenged to deliver value and convenience to consumers by, for example, providing compelling network services. One area of interest has been the development and optimization of short-range wireless communication technologies (e.g., Bluetooth, near field communication (NFC), etc.). In particular, Bluetooth Low Energy (BLE), one such development, has a feature called advertising whereby a BLE device (e.g., a BLE tag) can broadcast advertising data on one of three known advertising frequencies (e.g., 2402 megahertz (MHz), 2426 MHz, or 2480 MHz). The advertising data can then be picked up by another BLE device (e.g., a scanning device) that can scan on the three known frequencies. More specifically, a BLE tag has an internal processor and memory that enables it to receive data, to process the data, and to emit the results to be received by a scanning device (e.g., a BLE scanner). As a result, warehouses, manufacturing facilities, retail stores, etc. with fixed positioned scanning devices, for example, can utilize BLE tags for asset tracking (e.g., placing a BLE tag on a box of merchandise). However, anyone can develop a BLE tag that pretends to be an asset tag (i.e., a hacking device). Further, multiple scanning devices within close proximity to one another (e.g., in a warehouse) may waste the battery power of the BLE tag by repeatedly scanning the tag and causing the tag to unnecessarily repeat responses. Accordingly, service providers and device manufacturers face significant technical challenges in providing a service that prevents hacking devices from pretending to be a tag in a distribution chain and minimizes the power consumption of the tag.

Some Example Embodiments

Therefore, there is a need for an approach for providing a secure and energy efficient method of asset tracking using BLE tags.

According to one embodiment, a method comprises determining identification criteria associated with at least one scanning device. The method also comprises processing and/or facilitating a processing of the identification criteria to cause, at least in part, a transmission of at least one scan response to the at least one scanning device including, at least in part, asset data associated with at least one tag. The method further comprises causing, at least in part, a modification of one or more advertising packets of the at least one tag based, at least in part, on the transmission of the asset data.

According to another embodiment, an apparatus comprises at least one processor, and at least one memory including computer program code for one or more computer programs, the at least one memory and the computer program code configured to, with the at least one processor, cause, at least in part, the apparatus to determine identification criteria associated with at least one scanning device. The apparatus is also caused to process and/or facilitate a processing of the identification criteria to cause, at least in part, a transmission of at least one scan response to the at least one scanning device including, at least in part, asset data associated with at least one tag. The apparatus further causes, at least in part, a modification of one or more advertising packets of the at least one tag based, at least in part, on the transmission of the asset data.

According to another embodiment, a computer-readable storage medium carries one or more sequences of one or more instructions which, when executed by one or more processors, cause, at least in part, an apparatus to determine identification criteria associated with at least one scanning device. The apparatus is also caused to process and/or facilitate a processing of the identification criteria to cause, at least in part, a transmission of at least one scan response to the at least one scanning device including, at least in part, asset data associated with at least one tag. The apparatus further causes, at least in part, a modification of one or more advertising packets of the at least one tag based, at least in part, on the transmission of the asset data.

According to another embodiment, an apparatus comprises means for determining identification criteria associated with at least one scanning device. The apparatus also comprises means for processing and/or facilitating a processing of the identification criteria to cause, at least in part, a transmission of at least one scan response to the at least one scanning device including, at least in part, asset data associated with at least one tag. The apparatus further comprises means for causing, at least in part, a modification of one or more advertising packets of the at least one tag based, at least in part, on the transmission of the asset data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a secure and energy efficient method of asset tracking using BLE tags are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
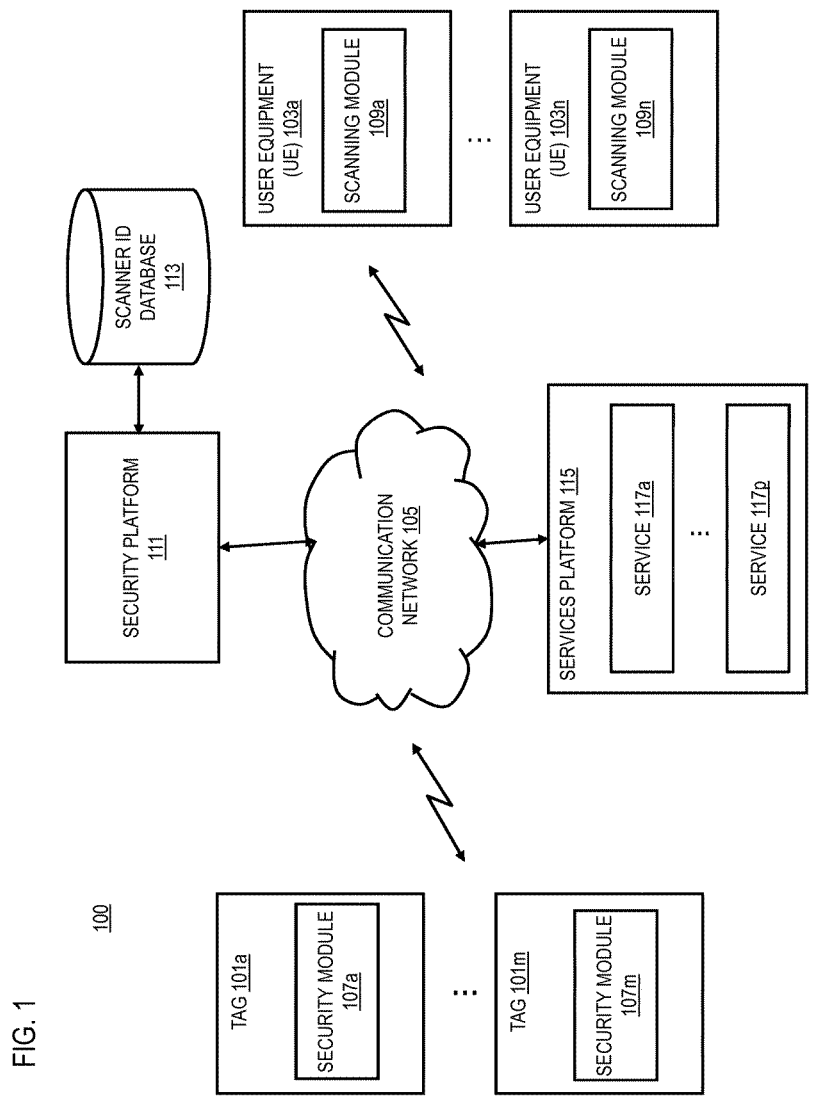
FIG. 1 is a diagram of a system capable of providing a secure and energy efficient method of asset tracking using BLE tags, according to one embodiment.

FIG. 1 is a diagram of a system capable of providing a secure and energy efficient method of asset tracking using BLE tags, according to one embodiment. As previously discussed, one area of interest among service providers and device manufacturers has been the development and optimization of short-range wireless communication technologies (e.g., Bluetooth, NFC, etc.). In particular BLE, one such development, has a feature called advertising whereby a BLE device (e.g., a BLE tag) can broadcast advertising data on one of three known advertising frequencies (e.g., 2402 MHz, 2426 MHz, or 2480 MHz). The advertising data can then be picked up by another BLE device (e.g., a scanning device) that can scan on the three known frequencies. More specifically, a BLE tag has an internal processor and memory that enables it to receive data, to process the data, and to emit the results to be received by a scanning device (e.g., a BLE scanner). As a result, warehouses, manufacturing facilities, retail stores, etc. with fixed positioned scanning devices, for example, can utilize the BLE tags for asset tracking (e.g., placing a BLE tag on a box of merchandise). However, anyone can develop a BLE tag that pretends to be an asset tag (i.e., a hacking device). Further, multiple scanning devices within close proximity of one another (e.g., in a warehouse) may waste the battery power of the BLE tag by repeatedly scanning the tag and causing it to unnecessarily repeat responses.

To address this problem, a system 100 of FIG. 1 introduces the capability of providing a secure and energy efficient method of asset tracking using BLE tags. In one embodiment, the system 100 first causes, at least in part, a transmission of one or more advertising packets (e.g., a BLE address) on a periodic basis (e.g., once every second) by at least one tag (e.g., a BLE tag). In particular, the one or more advertising packets associated with each broadcast are non-connectable and include, at least in part, a random address (e.g., an advertiser address) and advertising data (e.g., a counter value). More specifically, the system 100 introduces a counter value in the advertising data that incrementally increases with each broadcast (e.g., 0-256). By way of example, in one example use case, the at least one tag (e.g., a BLE tag) is attached to a particular asset (e.g., a box of merchandise) that is located in a warehouse, a manufacturing facility, a retail store, etc.

In one or more embodiments, the system 100 next determines identification criteria associated with at least one scanning device that is also located in the warehouse, the manufacturing facility, the retail store, etc. and that is listening or inquiring for advertising information being periodically transmitted or broadcasted by discoverable devices (e.g., the at least one tag). By way of example, the identification criteria may include, at least in part, at least one identification value (ID), at least one scan request, or a combination thereof associated with the least one scanning device. Moreover, the one or more communications between the at least one tag and the at least one scanning device are based, at least in part, on one or more short-range communication technologies including, at least in part, BLE.

In one embodiment, once the system 100 determines the presence of at least one scanning device (e.g., a BLE scanner), the system 100 first determines the at least one identification value (ID) associated with the at least one scanning device. In particular, each scanning device has a unique ID. The system 100 then processes and/or facilitates a processing of the at least one ID to determine whether the at least one scanning device is known to the at least one tag. By way of example, the at least one tag has a list of known scanning device IDs stored in its memory. Therefore, unknown scanning devices cannot be used for tracking the at least one tag.

In one or more embodiments, the system 100 next determines at least one scan request (i.e., a challenge) from the at least one scanning device based, at least in part, on a known identification value. In particular, advertising devices (e.g., the at least one tag) may receive one or more scan requests from listening devices (e.g., the at least one scanning device) to get additional user data (e.g., asset data) from an advertising device. In one embodiment, the system 100 then processes and/or facilitates a processing of the at least one scan request to decode the request to identify the challenge. By way of example, at least one tag (e.g., a BLE tag) shares a secret or a challenge with at least one scanning device (e.g., a BLE scanner). Once the system 100 determines the at least one tag and the at least one scanning device, in fact, share the same secret or challenge, the system 100 causes, at least in part, a transmission of at least one scan response based, at least in part, on the at least one scan request, wherein the at least one scan request and the at least one scan response constitute an encrypted pairing that prevents the communications from being stolen by another nearby scanning device.

More specifically, in one embodiment, the system 100 processes and/or facilitates a processing of the identification criteria (e.g., the scanning device ID, the scan request, or a combination thereof) to cause, at least in part, a transmission of the at least one scan response to the at least one scanning device including, at least in part, asset data associated with the at least one tag. In particular, the asset data includes, at least in part, one or more product identifications, a company identification (e.g., a unique 256 bit company ID), or a combination thereof. By way of example, the product identification may consist of 40 bits (e.g., 32 bits plus an 8 bit count) to identify multiple boxes of the same product (e.g., boxes of chairs). After the system 100 causes, at least in part, the transmission of the asset data, the system 100 causes, at least in part, a modification of the one or more advertising packets of the at least one tag. In particular, the system 100 modifies the counter value included with the one or more advertising packets. More specifically, the system 100 processes and/or facilitates a processing of the at least one scan request to cause, at least in part, a reset of the counter value associated with the one or more advertising packets of the at least one tag. As previously discussed, the counter value included in the one or more advertising packets incrementally increases with each broadcast (e.g., 0-256). Once the system 100 resets the counter value, the new counter has a time period associated with it (e.g., configured by the manufacturer). As a result, one or more other scanning devices will not process the at least one tag again until this time period has expired.

In one embodiment, the system 100 causes, at least in part, a cessation of the transmission of the asset data, the at least one scan response, or a combination thereof based, at least in part, on the modification of the one or more advertising packets. Consequently, the at least one scanning device and one or more other proximate scanning devices can coordinate tracking of the at least one tag without multiple scanning devices requesting the same data (e.g., asset data) from the at least one tag and thereby reducing power consumption by the at least one tag.

In one or more embodiments, the system 100 may also cause, at least in part, a reset of the counter value based, at least in part, on a time period, a maximum value, or a combination thereof. As previously discussed, the reset counter value has a time period associated with it (e.g., configured by the manufacturer). Again, one or more other proximate scanning devices will not process the at least one tag again if this time period has not yet expired. However, once the time period expires, the system 100 can once again determine identification criteria associated with a listening or inquiring scanning device (e.g., a BLE scanner).

In one embodiment, the system 100 can cause, at least in part, a modification of the periodic basis (e.g., once every second) associated with the transmission of the one or more advertising packets based, at least in part, on a change of the counter value, an absence of at least one identification value, or a combination thereof. By way of example, as previously discussed, the counter value associated with the at least one tag incrementally changes with each broadcast (e.g., 0-256), therefore once the system 100 determines that the counter value of the at least one tag has reached a maximum value (e.g., 256), the system 100 can modify the periodic basis from once every second to once every five seconds, for example. Similarly, if the system 100 determines that the at least one tag is no longer in the vicinity of the at least one scanning device (e.g., in a truck), the system 100 can also modify the periodic basis from once every second to once every five seconds, for example, and then later cause, at least in part, the periodic basis to return back to once every second when the system 100 determines that the at least one tag is again in the presence of another scanning device (e.g., a BLE scanner) that has the requisite identification criteria.

As shown in FIG. 1, the system 100 comprises one or more tags 101a-101m (e.g., BLE tags) (also collectively referred to as tags 101) having connectivity to one or more user equipment (UE) 103a-103n (e.g., BLE scanning devices) (also collectively referred as UEs 103) via a communication network 105. The tags 101 include or have access to a security module 107 that includes, at least in part, a processor and memory and enables the tags 101 to receive data, process the data, and emit the result to be received by the UEs 103. The UEs 103 include or have access to a scanning module 109 that can actively scan for discoverable devices and transmit the identification criteria associated with each UE 103.

In one embodiment, the system 100 may also include a security platform 111 that has substantially similar capabilities as the security module 107. In addition, the security platform 111 may include or be associated with at least one scanner identification (ID) database 113, which may exist in whole or in part within the security platform 111. In particular, the scanner ID database 113 may include one or more identification values associated with the UEs 103. In certain embodiments, the scanner ID database 113 may also include asset data (e.g., one or more product identifications, a company identification, or a combination thereof, at least one scan response based, at least in part, on at least one scan request, or a combination thereof.

In certain embodiments, the tags 101, the UEs 103, and the security platform 111 may also be connected to a services platform 115 via the communication network 105. The services platform 115 includes one or more services 117a-117p (also collectively referred to as services 117). The services may include update services for the BLE devices (e.g., the tags 103 and/or the UEs 103), inventory services, etc.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 103 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 103 can support any type of interface to the user (such as "wearable" circuitry, etc.).

In one embodiment, the security module 107/security platform 111 first causes, at least in part, a transmission of one or more advertising packets (e.g., a BLE address) on a periodic basis (e.g., once every second) by at least one tag 101. While the security module 107 and the security platform 111 are interchangeable, the various embodiments of the present invention disclosure herein mainly reference the security module 107 for the sake of explanation. As previously discussed, the one or more advertising packets associated with each broadcast are non-connectable and include, at least in part, a random address (e.g., an advertiser address) and advertising data (e.g., a counter value). More specifically, the system 100 introduces a counter value in the advertising data that incrementally increases with each broadcast (e.g., 0-256). By way of example, in one example use case, at least one tag 101 (e.g., a BLE tag) is attached to a particular asset (e.g., a box of merchandise) that is located in a warehouse, a manufacturing facility, a retail store, etc.

In one or more embodiments, the security module 107 next determines identification criteria associated with at least one UE 103 (e.g., a BLE scanning device) that is also located in the warehouse, the manufacturing facility, the retail store, etc. and is listening or inquiring for advertising information being periodically transmitted by discoverable devices (e.g., the tags 101). In particular, the one or more communications between a tag 101 and a UE 103 are based, at least in part, on one or more short-range communication technologies including, at least in part, BLE.

In one embodiment, once the security module 107 determines the presence of a UE 103, the security module 107 first determines the at least one identification value (ID) associated with the UE 103. As previously discussed, each UE 103 has a unique ID. The security module 107 then processes and/or facilitates a processing of the at least one UE 103 ID to determine whether the at least one UE 103 is known to the at least one tag 101. By way of example, the at least one tag 101 has a list of known UE 103 IDs stored in its memory. As a result, unknown UEs 103 cannot be used for tracking the at least one tag 101.

In one or more embodiments, the security module 107 next determines at least one scan request (i.e., a challenge) from the at least one UE 103 based, at least in part, on the known identification value. As previously discussed, advertising devices (e.g., the at least one tag 101) may receive one or more scan requests from listening devices (e.g., a UE 103) to get additional data (e.g., asset data) from an advertising device. In one embodiment, the security module 107 then processes and/or facilitates a processing of the at least one scan request to decode the request to identify the challenge. By way of example, at least one tag 101 (e.g., a BLE tag) shares a secret or a challenge with at least one UE 103 (e.g., a BLE scanner). Once the security module 107 determines that the at least one tag 101 and the UE 103, in fact, share the same secret or challenge, the security module 107 causes, at least in part, a transmission of at least one scan response based, at least in part, on the at least one scan request, wherein the at least one scan request and the at least one scan response constitute an encrypted pairing that prevents the communications from being stolen by another nearby UE 103.

More specifically, in one embodiment, the security module 107 processes and/or facilitates a process of the identification criteria (e.g., the UE 103 ID, the scan request, or a combination thereof) to cause, at least in part, a transmission of the at least one scan response to the at least one UE 103 including, at least in part, asset data associated with the at least one tag 101. As previously discussed, the asset data includes, at least in part, one or more product identifications, a company identification, or a combination thereof. Once the security module 107 causes, at least in part, the transmission of the asset data, the security module 107 causes, at least in part, a modification of the one or more advertising packets of the at least one tag 101. In particular, the security module 107 modifies the counter value included with the one or more advertising packets. More specifically, the security module 107 processes and/or facilitates a process of the at least one scan request to cause, at least in part, a reset of the counter value associated with the one or more advertising packets of the at least one tag 101. Once the security module 107 resets the counter value, the new counter has a time period associated with it (e.g., configured by the manufacturer). As a result, other UEs 103 will not process the at least one tag 101 again until this time period has expired.

In one embodiment, the security module 107 causes, at least in part, a cessation of the transmission of the asset data, the at least one scan response, or a combination thereof based, at least in part, on the modification of the one or more advertising packets. Consequently, the at least one UE 103 and one or more other proximate UEs 103 can coordinate tracking the at least one tag 101 without multiple UEs 103 requesting the same data (e.g., asset data) from the at least one tag 101 and thereby reducing power consumption by the at least one tag 101.

In one or more embodiments, the security module 107 may also cause, at least in part, a reset of the counter value based, at least in part, on a time period, a maximum value, or a combination thereof. As previously discussed, the reset count value has a time period associated with it (e.g., configured by the manufacturer). Again, one or more other proximate UEs 103 will not process the at least one tag 101 again if this period has not yet expired. However, once the time period expires, the security module 107 can once again determine identification criteria associated with a listening or inquiring UE 103 (e.g., a BLE scanner).

In one embodiment, the security module 107 can also cause, at least in part, a modification of the periodic basis associated with the transmission of the one or more advertising packets (e.g., once every second) based, at least in part, on a change of the counter value, an absence of at least one identification value, or a combination thereof. By way of example, as previously discussed, the counter value associated with the at least one tag 101 incrementally increases with each broadcast (e.g., 0-256), therefore once the security module 107 determines that the counter value of the at least one tag 101 has reached a maximum value (e.g., 256), the security module 107 can modify the periodic basis from once every second to once every five seconds, for example. Similarly, if the security module 107 determines that the at least one tag 101 is no longer in the vicinity of the at least one UE 103 (e.g., in a truck), the security module 107 can also modify the periodic basis from once every second to once every five seconds, for example, and then later cause, at least in part, the periodic basis to return back to once every second when the security module 107 determines that the at least one tag 101 is again in the presence of another UE 103 (e.g., a BLE scanner) that has the requisite identification criteria.

By way of example, the tags 101, the UEs 103, the security platform 111, and the services platform 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
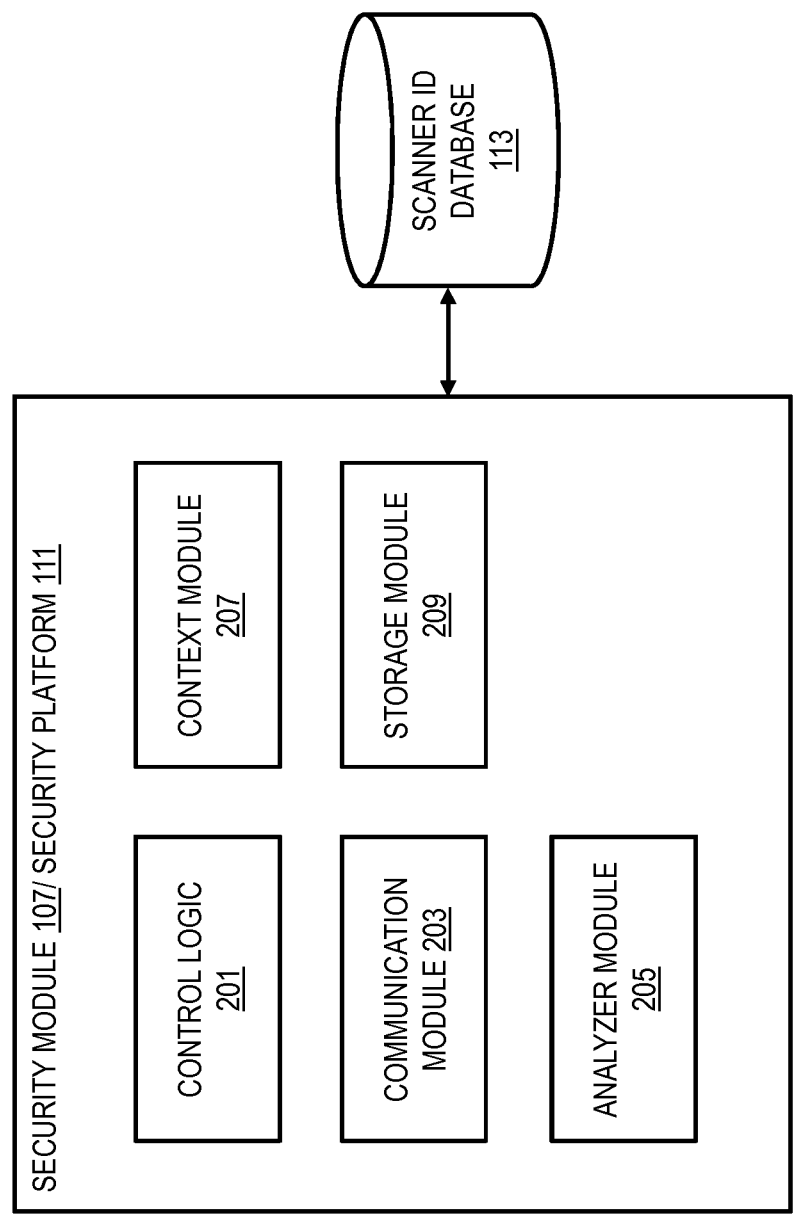
FIG. 2 is a diagram of the components of a security module/security platform, according to one embodiment.

FIG. 2 is a diagram of the components of a security module 107/security platform 111, according to one embodiment. As previously discussed, while the security module 107 and the security platform 111 are interchangeable, the various embodiments of the present invention disclosed herein mainly reference the security module 107 for the sake of explanation. By way of example, the security module 107 includes one or more components for providing a secure and energy efficient method of asset tracking using BLE tags. It is contemplated that the functions of these components may be combined in one or more components or performed by other components of equivalent functionality. In this embodiment, the security module 107 includes a control logic 201, a communication module 203, an analyzer module 205, a context module 207, and a storage module 209.

The control logic 201 oversees tasks, including tasks performed by the communication module 203, the analyzer module 205, the context module 207, and the storage module 209. For example, although the other modules may perform the actual task, the control logic 201 may determine when and how those tasks are performed or otherwise direct the other modules to perform the task. The control logic 201 may also be used to cause, at least in part, a transmission of the at least one scan response based, at least in part, on determining the at least one scan request. The control logic 201 also may be used to cause, at least in part, a cessation of the transmission of the asset data, the at least one scan response, or a combination thereof based, at least in part, on the modification of the one or more advertising packets.

The communication module 203 is used for communication between the tags 101, the UEs 103, the security module 107, the scanning module 109, the security platform 111, the scanner ID database 113, the services platform 115, and the services 117. The communication module 203 may also be used to communicate commands, requests, data, etc. The communication module 203 may also be used to cause, at least in part, a transmission of the one or more non-connectable advertising packets (e.g., a BLE address) on a periodic basis (e.g., once every second) to at least one scanning device. The communication module 203 also may be used to determining identification criteria (e.g., at least one identification value (ID) and/or at least one scan request) associated with at least one scanning device (e.g., a BLE scanner). In particular, the communications between the at least one tag and the at least one scanning device facilitated by the communication module 203 are based, at least in part, on one or more short-range communication technologies including, at least in part, BLE.

The analyzer module 205 is used to process and/or facilitate a processing of the at least one identification value (ID) associated with at least one scanning device to determine whether the device is known to the at least one tag (e.g., among a list of known devices stored in the scanning ID database 113). The analyzer module 205 may also be used to process and/or facilitate a processing of the at least one scan request of the at least one scanning device to decode the at least one scan request to determine the challenge. The analyzer module 205 also may be used to process and/or facilitate a processing of the identification criteria (e.g., at least one identification value and/or at least one scan request) to cause, at least in part, a transmission of at least one scan response to at least one scanning device including, at least in part, asset data (e.g., product identification, a company identification, etc.) associated with the at least one tag. Further, the analyzer module 205 may also be used to process and/or facilitate a processing of the at least one scan request to cause, at least in part, a reset of the counter value associated with the one or more advertising packets.

The context module 207 is used to cause, at least in part, a modification of one or more advertising packets (e.g., the counter value) of the at least one tag based, at least in part, on the transmission of the asset data. The context module 207 also may be used to cause, at least in part, a reset of the counter value included with the one or more advertising packets based, at least in part, on a time period (e.g., configured by the manufacturer), a maximum value, or a combination thereof. The context module 207 may also be used to cause, at least in part, a modification of the periodic basis associated with the transmission of the one or more advertising packets (e.g., once every second to once every five seconds) based, at least in part, on a change of the counter value (e.g., an incremental increase), an absence of at least one identification value (e.g., if the at least one tag is in a truck), or a combination thereof.

The storage module 209 is used manage the storage of the identification values (IDs) associated with the at least one scanning device and one or more other known scanning devices. In certain embodiments, the storage module 209 may be used to manage the storage of the asset data (e.g., one or more product identifications, a company identification, or a combination thereof), the at least one scan response based, at least in part, on at least one scan request, or a combination thereof.

Figure 3:
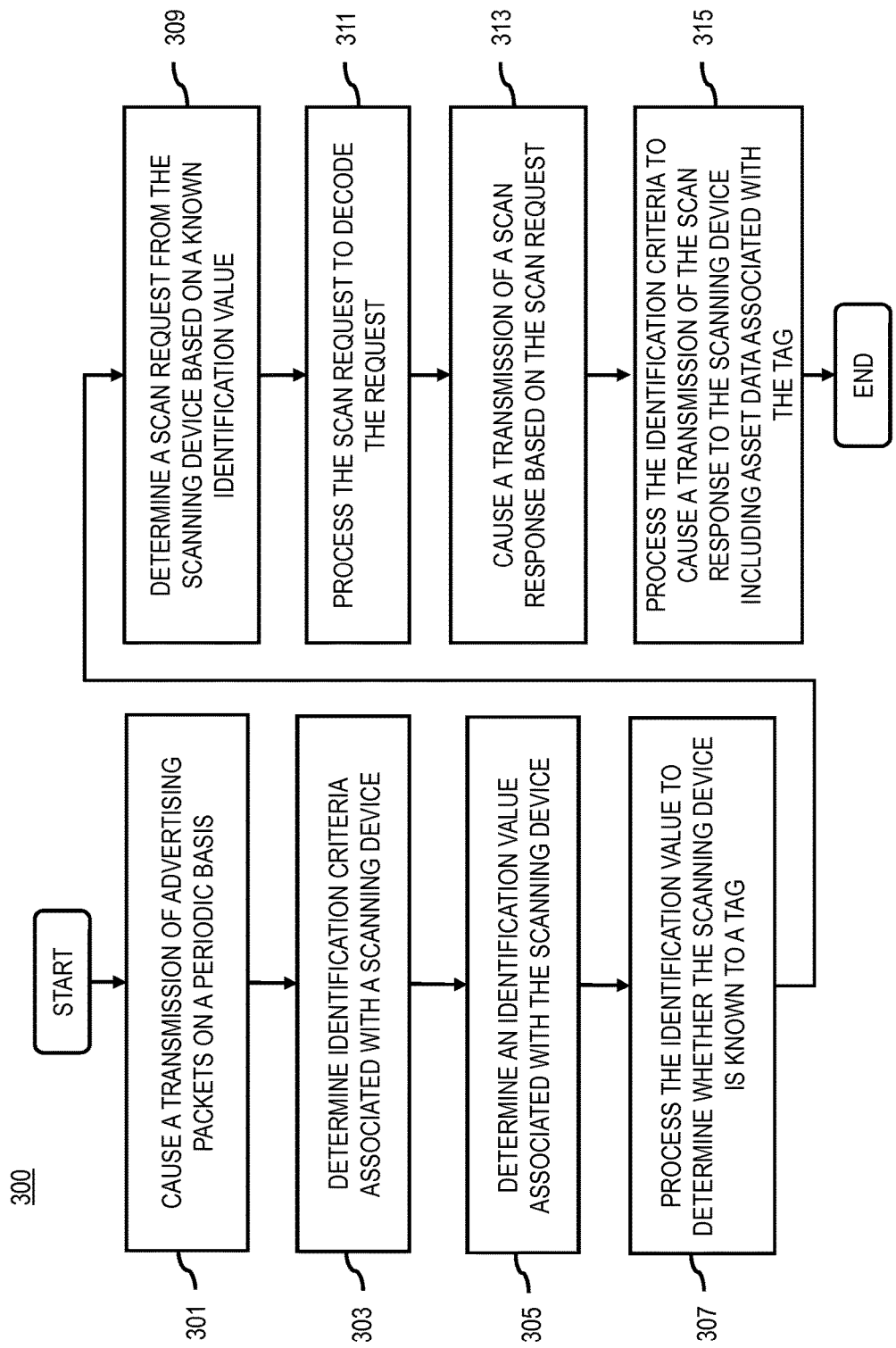
FIGS. 3 and 4 are flowcharts of processes for providing a secure and energy efficient method of asset tracking using BLE tags, according to one embodiment.
Figure 4:
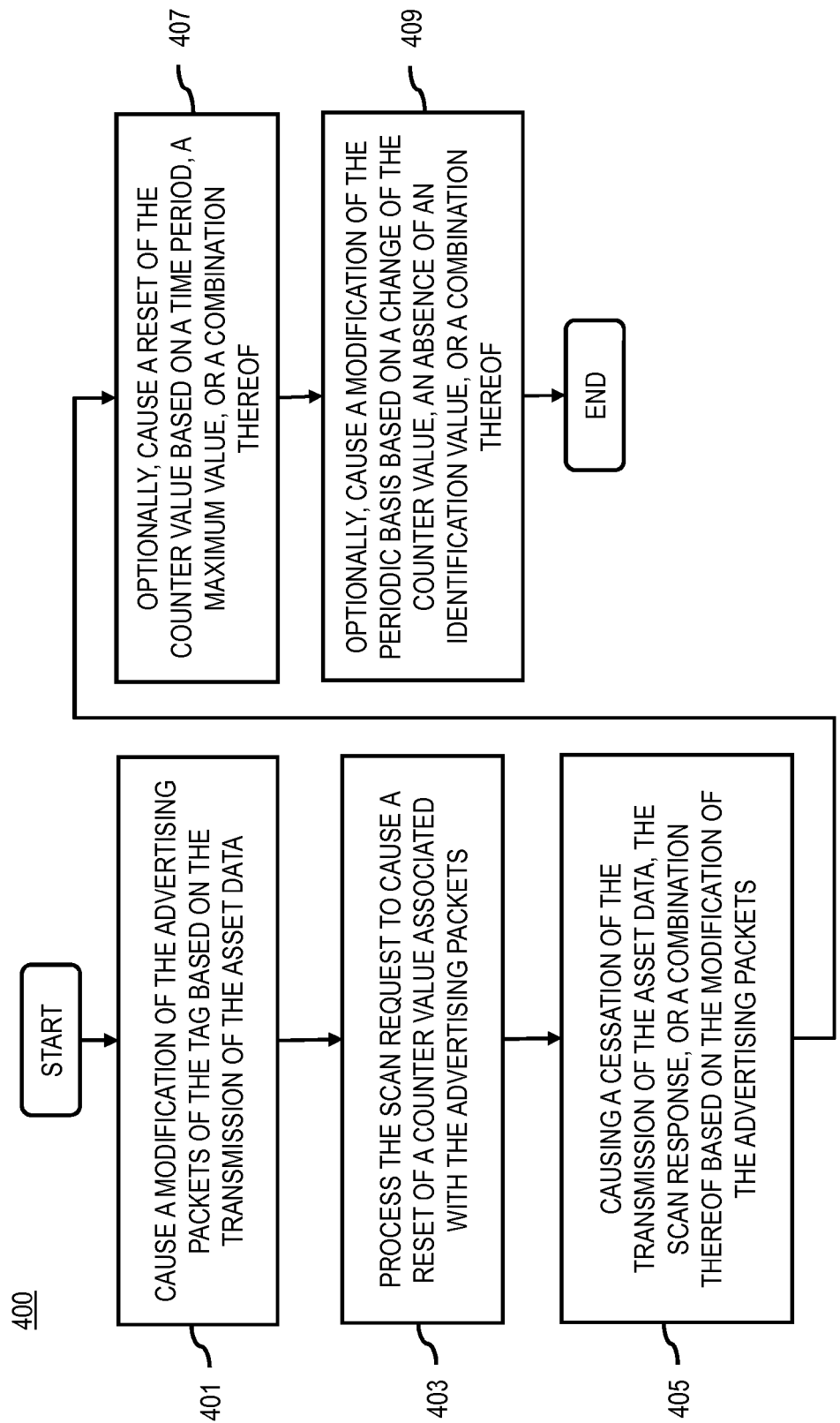
Figure 8:
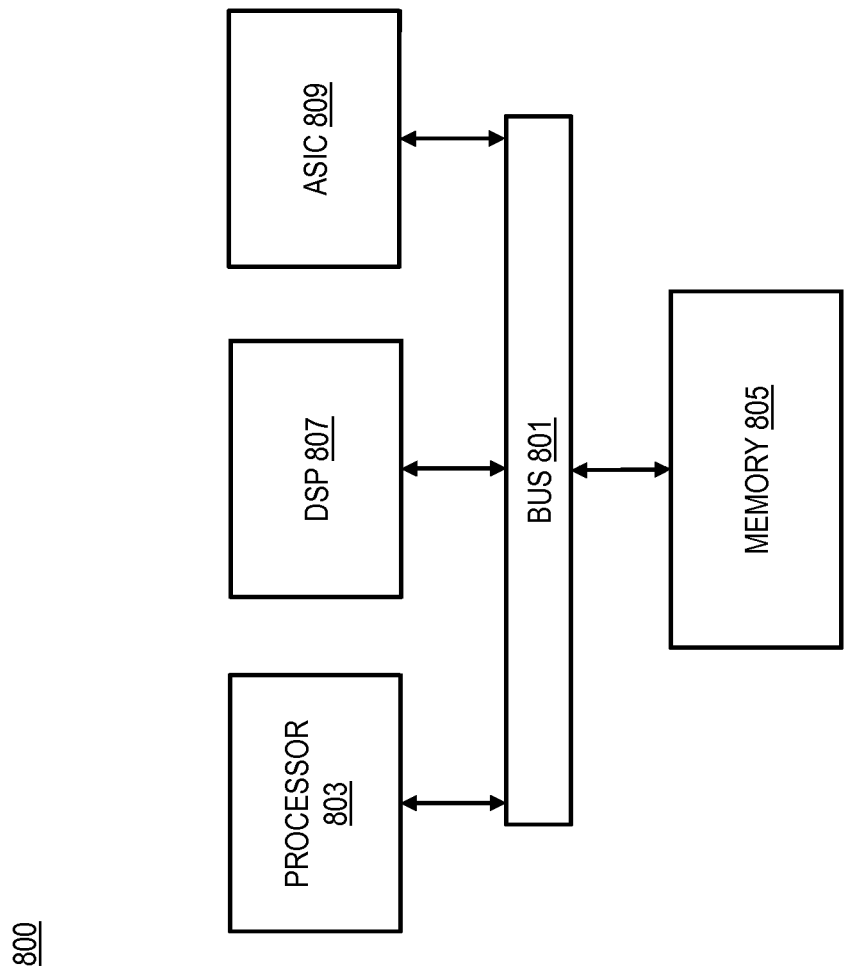
FIG. 8 is a diagram of a chip set that can be used to implement an embodiment of the invention.

FIGS. 3 and 4 are flowcharts of processes for providing a secure and energy efficient method of asset tracking using BLE tags, according to one embodiment. FIG. 3 depicts a process 300 of determining identification criteria associated with at least one scanning device. In one embodiment, the security module 107/security platform 111 performs the process 300 and is implemented in, for instance, a chip set including a processor and a memory as shown in FIG. 8. In step 301, the security module 107 causes, at least in part, a transmission of the one or more advertising packets on a periodic basis. By way of example, the one or more advertising packets are non-connectable and are initially broadcast by the security module 107 once every second. In addition, the one or more advertising packets include, at least in part, a random address (e.g., an advertiser address) and advertising data (e.g., a counter value). More specifically, the security module 107 introduces a counter value in the advertising data that incrementally increases with each broadcast (e.g., 0-256).

In step 303, the security module 107 determines identification criteria associated with at least one scanning device. By way of example, the identification criteria may include a unique identification value (ID), a scan request, or a combination thereof associated with at least one scanning device (e.g., a BLE scanner). In particular, the identification criteria is used by the security module 107 to prevent hacking devices from pretending to be one or more tags in the distribution chain.

In step 305, the security module 107 determines the at least one identification value associated with the at least one scanning device. By way of example, each scanning device has a unique ID. Then in step 307, the security module 107 processes and/or facilitates a processing of the at least one identification value to determine whether the at least one scanning device is known to the at least one tag, wherein the identification criteria is based, at least in part, on the at least one identification value. As previously discussed, the at least one tag has a list of known scanning device IDs stored in its memory. As a result, unknown scanning devices cannot be used for tracking the at least one tag.

In step 309, the security module 107 determines at least one scan request from the at least one scanning device based, at least in part, on a known identification value. By way of example, advertising devices (e.g., the at least one tag) may receive one or more scan requests from listening devices (e.g., the at least one scanning device) to get additional data (e.g., asset data) from the advertising device. In step 311, the security module 107 processes and/or facilitates a processing of the at least one scan request to decode the request. By way of example, at least one tag (e.g., a BLE tag) shares a secret or a challenge with at least one scanning device (e.g., a BLE scanner) and the security module 107 decodes the at least one request to determine the shared challenge. In step 313, once the security module 107 determines that the at least one tag and the at least one scanning device, in fact, share the same secret or challenge, the security module 107 causes, at least in part, a transmission of the at least one scan response based, at least in part, on the at least one scan request, wherein the at least one scan request and the at least one scan response constitute an encrypted pairing. As a result of the encrypted pairing, the communications between the at least one tag and the at least one scanning cannot be stolen by another nearby scanning device.

In step 315, the security module 107 processes and/or facilitates a processing of the identification criteria to cause, at least in part, a transmission of at least one scan response to the at least one scanning device including, at least in part, asset data associated with at least one tag. By way of example, the asset data may include, at least in part, one or more product identifications, a company identification (e.g., a unique 256 bit company ID), or a combination thereof. More specifically, the product identification may consist of 40 bits (e.g., 32 bits plus an 8 bit count) to identify multiple boxes of the same product (e.g., boxes of chairs).

FIG. 4 depicts a process 400 of modifying one or more advertising packets associated with at least one tag. In one embodiment, the security module 107/security platform 111 performs the process 400 and is implemented in, for instance, a chip set including a processor and a memory as shown in FIG. 8. In step 401, the security module 107 causes, at least in part, a modification of one or more advertising packets of the at least one tag based, at least in part, on the transmission of the asset data. By way of example, the security module 107 modifies the counter value included in the one or more advertising packets. More specifically, in step 403, the security module 107 processes and/or facilitates a processing of the at least one scan request to cause, at least in part, a reset of a counter value associated with the one or more advertising packets, wherein the identification criteria is based, at least in part, on the at least one scan request. As previously discussed, the counter value included in the one or more advertising packets incrementally increases with each broadcast (e.g., 0-256). Once the security module 107 resets the counter value, the new counter has a time period associated with it (e.g., configured by the manufacturer). As a result, other scanning devices will not process the at least one tag again until this time period has expired.

In step 405, the security module 107 causes, at least in part, a cessation of the transmission of the asset data, the at least one scan response, or a combination thereof based, at least in part, on the modification of the one or more advertising packets. As previously discussed, once the counter value associated with the one or more advertising packets is modified by the security module 107, the at least on tag will not transmit asset data, respond to a scan request, or a combination thereof. Consequently, the at least one scanning device and one or more other proximate scanning devices can coordinate tracking the at least one tag without multiple scanning devices requesting the same data (e.g., asset data) from the at least one tag and thereby reducing power consumption by the at least one tag.

In step 407, the security module 107 optionally causes, at least in part, a reset of the counter value based, at least in part, on a time period, a maximum value, or a combination thereof. As previously discussed, the reset counter value has a time period associated with it (e.g., configured by the manufacturer) and until this time period expires, the one or more other proximate scanning devices will not process the at least one tag again. However, once the time period expires, the security module 107 can once again determine identification criteria associated with listening or inquiring scanning devices (e.g., a BLE scanner).

In step 409, the security module 107 optionally causes, at least in part, a modification of the periodic basis based, at least in part, on a change of the counter value, an absence of at least one identification value, or a combination thereof. By way of example, as previously discussed, the counter value incrementally increases with each broadcast (e.g., 0-256), therefore once the security module 107 determines that the counter value associated with the at least one tag has reached a maximum value (e.g., 256), the security module 107 can modify the periodic basis for transmitting or broadcasting the one or more advertising packets from once every second to once every five seconds, for example. Similarly, if the security module 107 determines that the at least one tag is no longer in the vicinity of the at least one scanner (e.g., in a truck), the security module 107 can also modify the periodic basis from once every second to once every five seconds, for example, and then later return the periodic basis back to once every second when the security module 107 determines that the at least one tag is again in the presence of another scanning device that has the requisite identification criteria.

Figure 5:
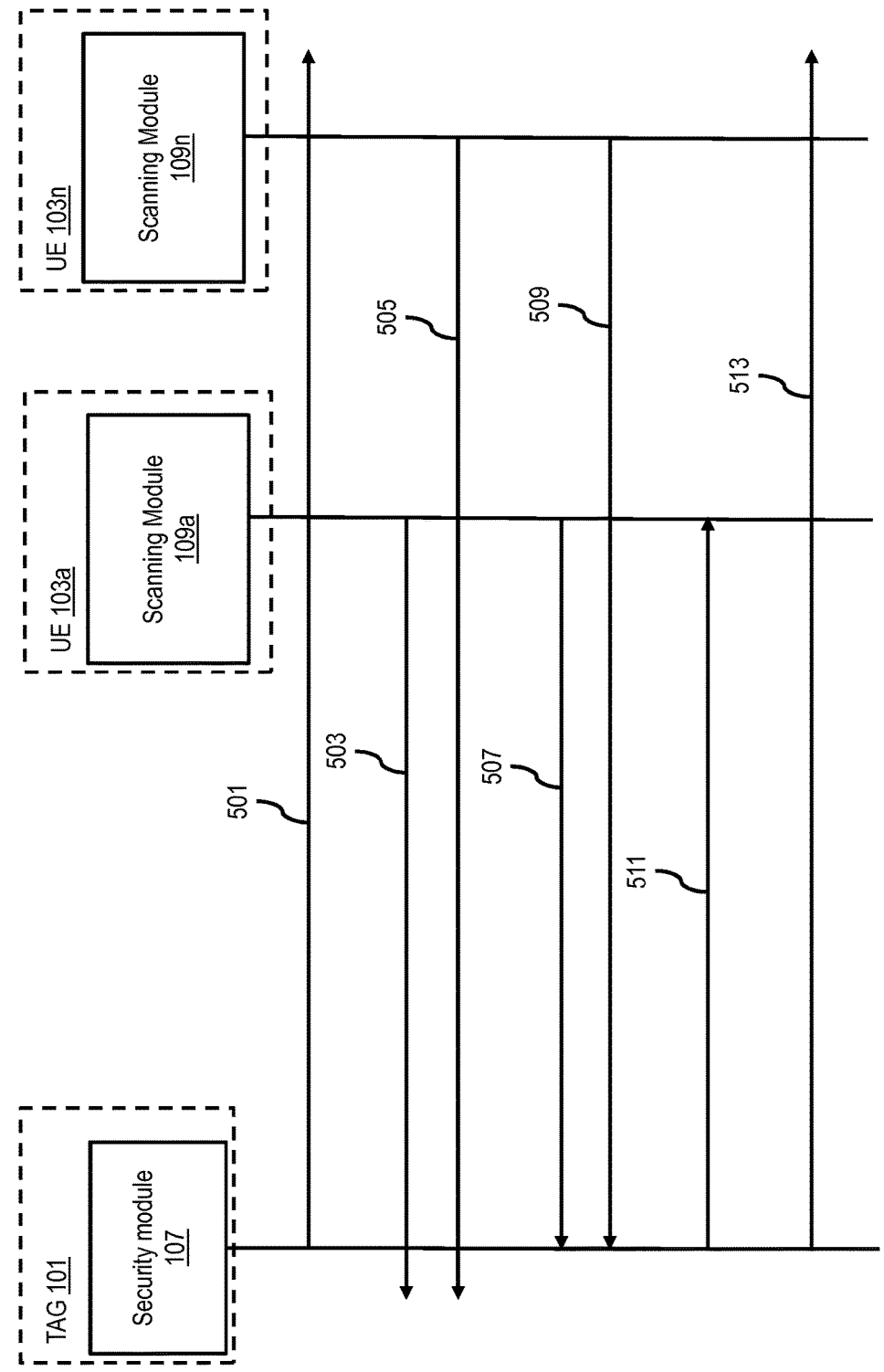
FIG. 5 is a ladder diagram that illustrates sequences of a secure method of asset tracking, according to various embodiments.

FIG. 5 is a ladder diagram illustrating sequences of a secure method of asset tracking. The processes in the diagram 500 include at least one tag 101 (e.g., a BLE tag), which further includes a security module 107 (e.g., a processer and memory) and a UE 103a and a UE 103n (e.g., two BLE scanners) (also collectively referred to as UEs 103) that further include a scanning module 109a and a scanning module 109n, respectively. A network process is represented by a thin vertical line. A step or message passed from one element to another is presented by horizontal arrows. In step 501, the at least one tag 101 (e.g., attached to a box of garments) broadcasts one or more advertising packets (e.g., a BLE address) on a periodic basis (e.g., once every second). In particular, the one or more advertising packets associated with each broadcast are non-connectable and include, at least in part, a random address (e.g., an advertiser address) and advertising data (e.g., a counter value). More specifically, the security module 107 introduces a counter value in the advertising data that incrementally increases with each broadcast (e.g., 0-256). In steps 503 and 505, the UEs 103 respectively scan for advertising devices (e.g., the at least one tag 101). Based on the active scans of the UEs 103, the security module 107 determines identification criteria associated with the UEs 103. By way of example, the identification criteria may include, at least in part, at least one identification value (ID), at least one scan request, or a combination thereof associated with each UE 103. Moreover, the one or more communications between the at least one tag 101 and the UEs 103 are based, at least in part, on one or more short-range communication technologies including, at least in part, BLE.

In one embodiment, the security module 107 first determines the at least one identification value (ID) associated with each UE 103. As previously stated, each UE 103 has a unique ID. The security module 107 then processes and/or facilitates a processing of the IDs to determine whether the UEs 103 are known to the at least one tag 101. By way of example, the at least one tag 101 has a list of known scanning device IDs stored in its memory. In steps 507 and 509, the UE 103a and the UE 103n transmit at least one scan request, respectively, to the at least one tag 101. In step 511, having determined that the ID of the UE 103n is not a known scanning device to the at least one tag 101 (e.g., a scanning device responsible for tracking office furniture), the security module 107 then processes and/or facilitates a processing of the identification criteria (e.g., the scanning ID, the scan request, or a combination thereof) of the UE 103a to cause, at least in part, a transmission of at least one scan response to the UE 103a including, at least in part, asset data associated with the at least one tag 101. As previously discussed, the asset data includes, at least in part, one or more product identifications (e.g., shirts), a company identification, or a combination thereof.

In one or more embodiments, once the security module 107 causes, at least in part, a transmission of the asset data as illustrated in step 511, the security module 107 modifies the counter value included with the one or more advertising packets. More specifically, the security module 107 processes and/or facilitates a processing of the scan request from the UE 103a (step 507) to cause, at least in part, a reset of the counter value associated with the one or more advertising packets of the at least one tag 101. Based on the reset counter value, the UEs 103 will not process a periodic transmission of one or more advertising packets by the security module 107 (e.g., as depicted in step 513) again until the time period has expired. Consequently, the UEs 103 can coordinate tracking of the at least one tag 101 without multiple scanning devices (e.g., the UEs 103) requesting the same data from the at least one tag 101 and thereby reducing power consumption by the at least one tag 101.

Figure 6:
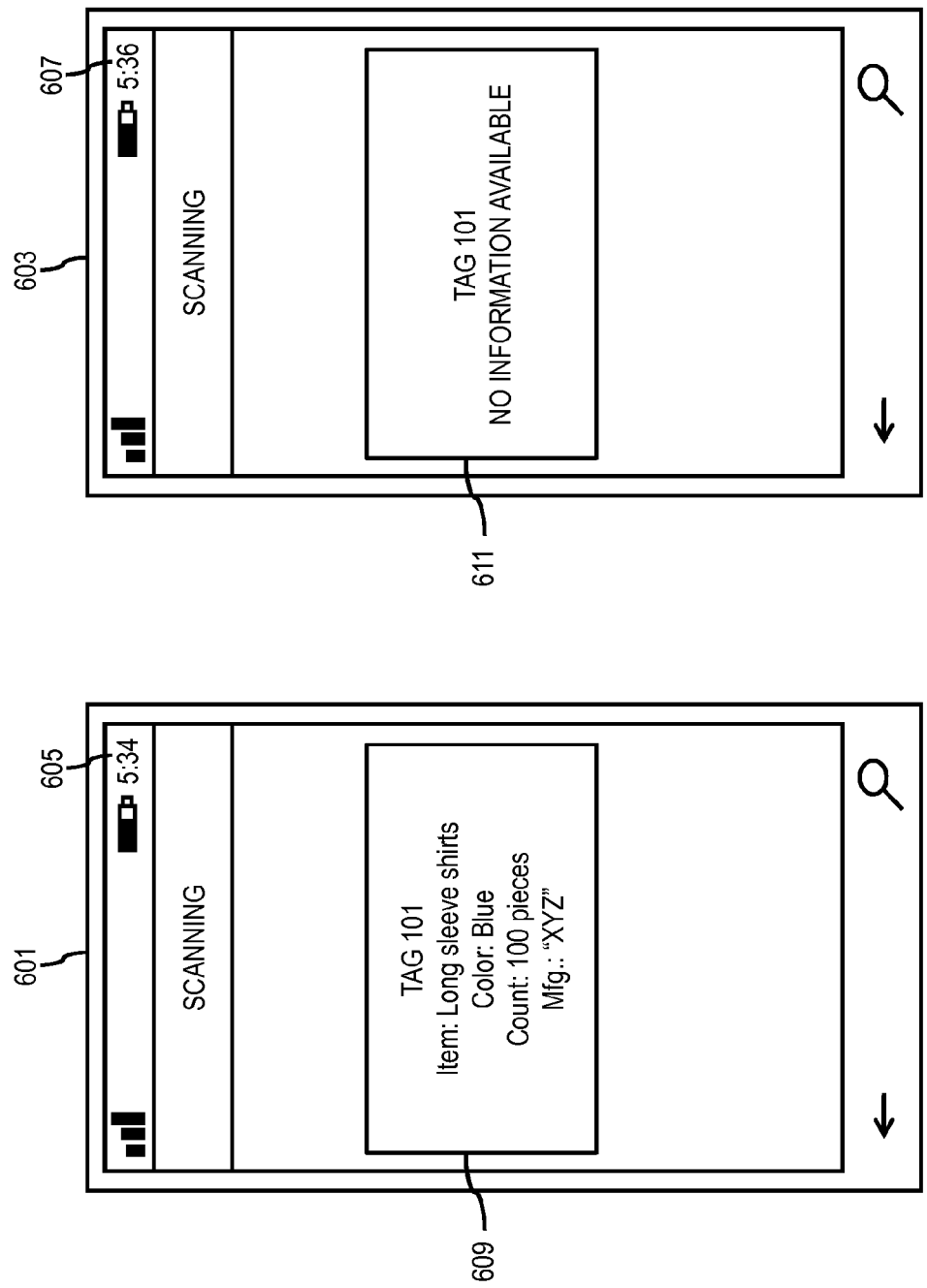
FIG. 6 is a diagram of user interfaces utilized in the processes of FIGS. 3 and 4, according to various embodiments.

FIG. 6 is a diagram of example user interfaces utilized in the processes of FIGS. 3 and 4, according to various embodiments. As shown, the example user interfaces of FIG. 6 include one or more user interface elements and/or functionalities created and/or modified based, at least in part, on information, data, and/or signals resulting from the processes (e.g., processes 300 and 400) described with respect to FIGS. 3 and 4. More specifically, FIG. 6 illustrates two user interfaces (e.g., interfaces 601 and 603) depicting BLE scanning devices (e.g., mobile phones) located some distance apart in a warehouse, a manufacturing facility, a retail store, etc. as illustrated by the depiction of clocks 605 and 607, respectively. In particular, FIG. 6 depicts how the system 100 minimizes power consumption in at least one tag (e.g., a BLE tag) attached to a box of merchandise, for example, in the warehouse, the manufacturing facility, the retail store, etc. In one embodiment, the system 100 first causes, at least in part, a transmission of one or more advertising packets (e.g., a BLE address) by at least on tag (e.g., the Tag 101). As previously discussed, the one or more advertising packets associated with each broadcast are non-connectable and include, at least in part, a random address (e.g., an advertiser address) and advertising data (e.g., a counter value). In one or more embodiments, the system 100 next determines identification criteria (e.g., at least one identification value (ID), a scan request, or a combination thereof) associated with at least one scanning device (e.g., interface 601) that is listening or inquiring for advertising information being periodically transmitted or broadcasted by a discoverable device (e.g., the Tag 101). In this example use case, the system 100 determined that the scanning ID of the interface 601 is known to the Tag 101 and the Tag 101 and the interface 601, in fact, share a secret or challenge decoded by the system 100 from the scan request of the interface 601. In one embodiment, the system 100 then processes and/or facilitates a processing of the identification criteria to cause, at least in part, a transmission of at least one scan response to the interface 601 including, at least in part, asset data associated with the Tag 101. In particular, the asset data includes, at least in part, one or more product identifications (e.g., "Item: Long sleeve shirts," "Color: Blue," "Count: 100 pieces," etc.), a company identification (e.g., "XYZ"), or a combination thereof as depicted in the information block 609 of interface 601.

In one or more embodiments, once the system 100 causes, at least in part, the transmission of the asset data, the system 100 cause, at least in part, a modification of the one or more advertising packets of the Tag 101. In particular, the system 100 processes and/or facilitates a processing of the at least one scan request of the interface 601 to cause, at least in part, a reset of the counter value included with the one or more advertising packets of the Tag 101. As previously discussed, once the system 100 resets the counter value, the new counter value has a time period (e.g., configured by the manufacturer) and until the time period expires other scanning devices (e.g., interface 603) further along in the distribution chain (e.g., depicted by the elapse of two minutes) will not process the Tag 101 again. For example, the interface 603 can determine the BLE address, for example, of the Tag 101 as depicted in the information box 611 of the interface 603, but the interface 603 is unable to determine any other information regarding the Tag 101. Because the system 100 does not again request a scan response, asset data, or a combination thereof from the Tag 101 shortly after the interface 601 requested this exact information from the Tag 101, the system 100 reduces the power consumption by the Tag 101.

The processes described herein for providing a secure and energy efficient method of asset tracking using BLE tags may be advantageously implemented via software, hardware, firmware or a combination of software and/or firmware and/or hardware. For example, the processes described herein, may be advantageously implemented via processor (s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
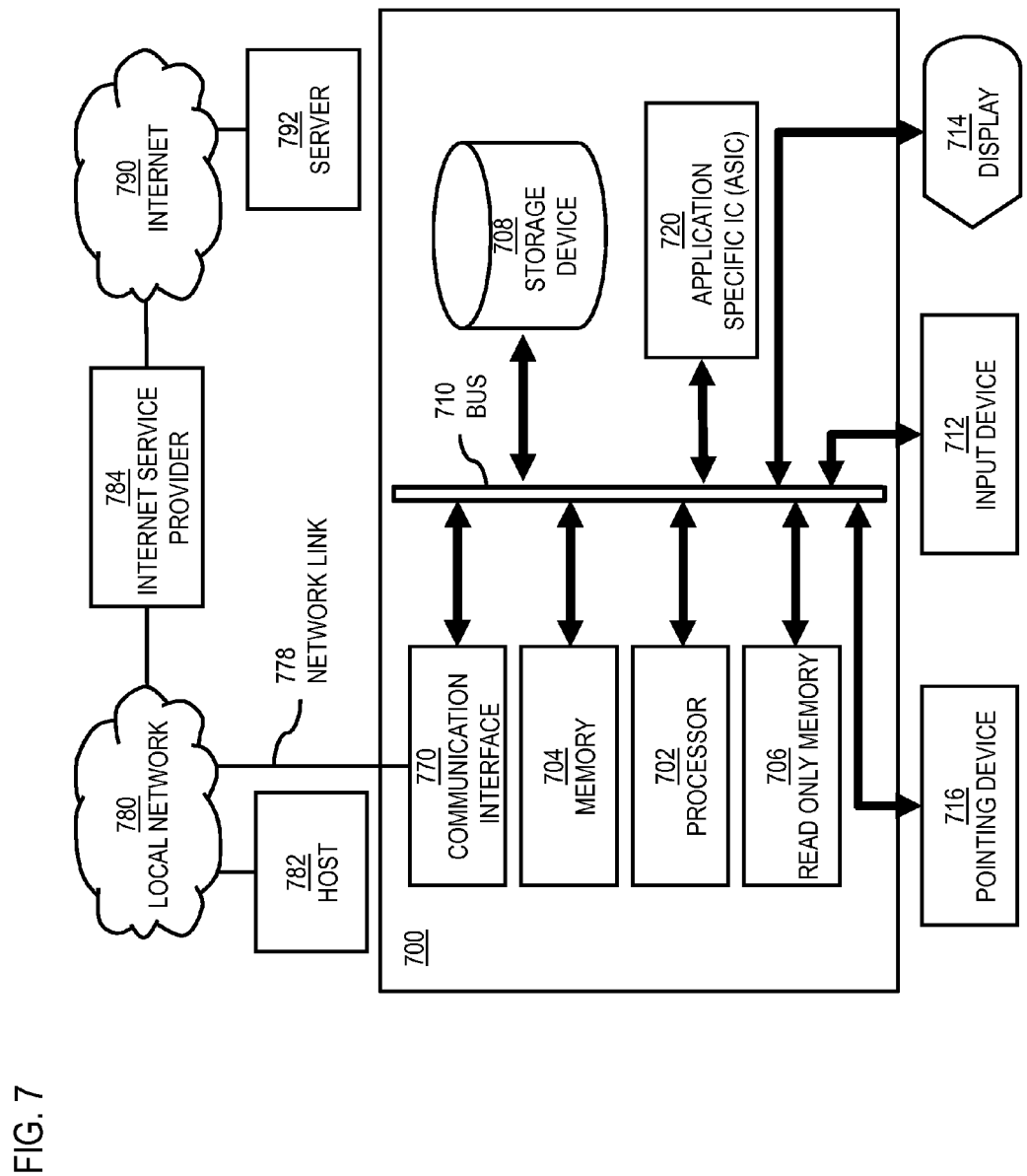
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a secure and energy efficient method of asset tracking using BLE tags as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a secure and energy efficient method of asset tracking using BLE tags.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide a secure and energy efficient method of asset tracking using BLE tags. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing a secure and energy efficient method of asset tracking using BLE tags. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a secure and energy efficient method of asset tracking using BLE tags, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a secure and energy efficient method of asset tracking using BLE tags to the UE 103.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a secure and energy efficient method of asset tracking using BLE tags as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a secure and energy efficient method of asset tracking using BLE tags.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a secure and energy efficient method of asset tracking using BLE tags. The memory 805 also stores the data associated with or generated by the execution of the inventive steps.

Figure 9:
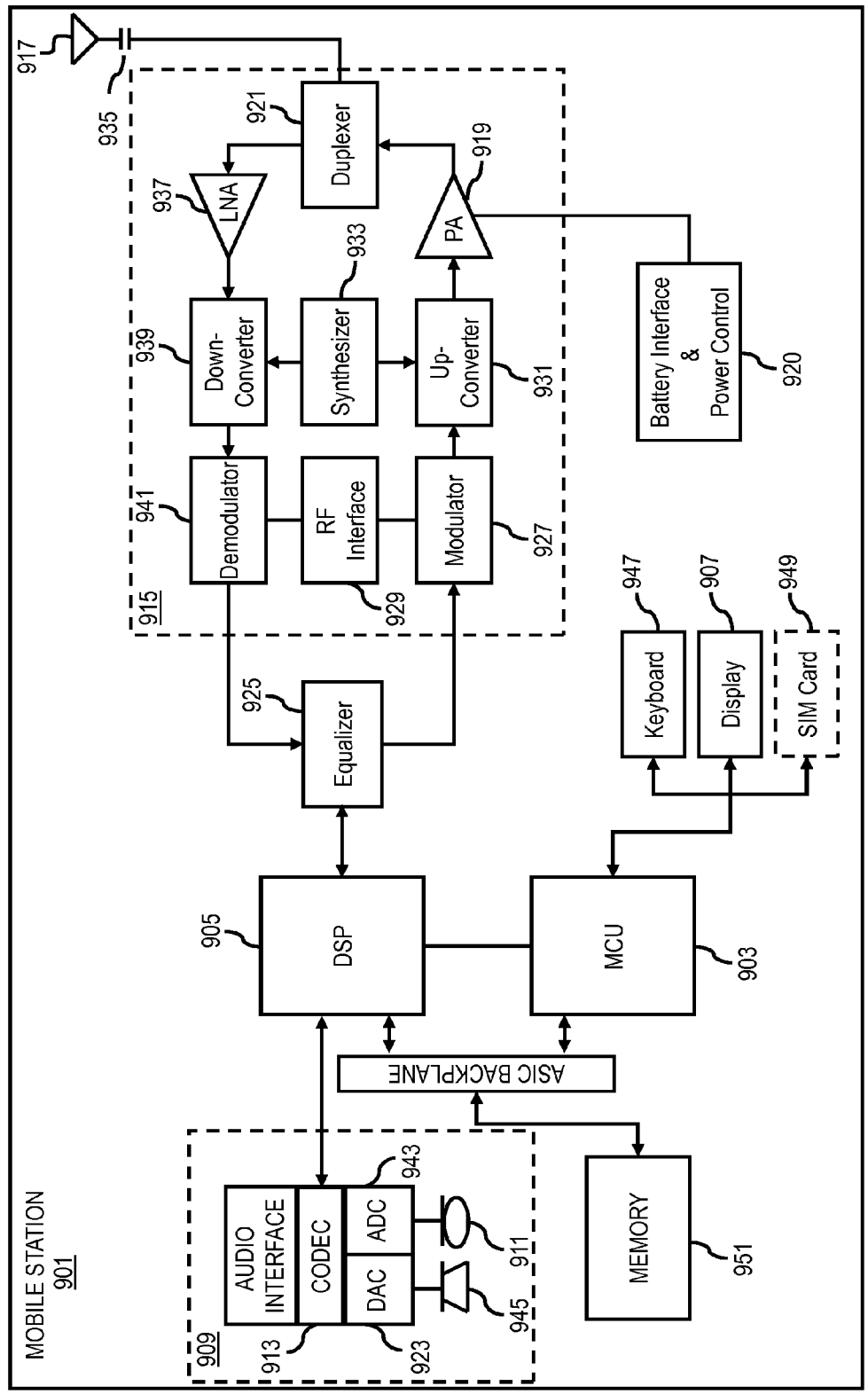
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing a secure and energy efficient method of asset tracking using BLE tags. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry"

would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a secure and energy efficient method of asset tracking using BLE tags. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a secure and energy efficient method of asset tracking using BLE tags. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of identification criteria associated with at least one scanning device;
   a processing of the identification criteria to cause, at least in part, a transmission of at least one scan response from at least one tag to the at least one scanning device including, at least in part, asset data associated with the at least one tag; and
   a modification of a counter value associated with one or more advertising packets of the at least one tag based, at least in part, on the transmission of the asset data.

2. A method of claim 1, wherein the (1) data and/or (2) information and/or (3) at least one signal are further based, at least in part, on the following:
   a cessation of the transmission of the asset data, the at least one scan response, or a combination thereof based, at least in part, on the modification of the one or more advertising packets.

3. A method of claim 2, wherein the (1) data and/or (2) information and/or (3) at least one signal are further based, at least in part, on the following:
   at least one determination of at least one identification value associated with the at least one scanning device; and
   a processing of the at least one identification value to determine whether the at least one scanning device is known to the at least one tag,
   wherein the identification criteria is based, at least in part, on the at least one identification value.

4. A method of claim 1, wherein the (1) data and/or (2) information and/or (3) at least one signal are further based, at least in part, on the following:
   at least one determination of at least one scan request from the at least one scanning device based, at least in part, on a known identification value; and
   a processing of the at least one scan request to cause, at least in part, a reset of the counter value associated with the one or more advertising packets,
   wherein the identification criteria is based, at least in part, on the at least one scan request.

5. A method of claim 1, wherein the (1) data and/or (2) information and/or (3) at least one signal are further based, at least in part, on the following:
   a transmission of the one or more advertising packets on a periodic basis; and
   a modification of the periodic basis based, at least in part, on a change of the counter value, an absence of at least one identification value, or a combination thereof.

6. A method of claim 4, wherein the (1) data and/or (2) information and/or (3) at least one signal are further based, at least in part, on the following:
   a processing of the at least one scan request to decode the scan request; and
   a transmission of the at least one scan response based, at least in part, on the at least one request,
   wherein the at least one scan request and the at least one scan response constitute an encrypted pairing.

7. A method of claim 4, wherein the (1) data and/or (2) information and/or (3) at least one signal are further based, at least in part, on the following:
   a reset of the counter value based, at least in part, on a time period, a maximum value, or a combination thereof.

8. A method of claim 1, wherein one or more communications between the at least one tag and the at least one scanning device are based, at least in part, on one or more short-range communication technologies including, at least in part, Bluetooth Low Energy.

9. A method of claim 1, wherein the one or more advertising packets are non-connectable.

10. A method of claim 1, wherein the asset data includes, at least in part, one or more product identifications, a company identification, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
    determine identification criteria associated with at least one scanning device;
    process and/or facilitate a processing of the identification criteria to cause, at least in part, a transmission of at least one scan response from at least one tag to the at least one scanning device including, at least in part, asset data associated with the at least one tag; and
    cause, at least in part, a modification of a counter value associated with one or more advertising packets of the at least one tag based, at least in part, on the transmission of the asset data.

12. An apparatus of claim 11, wherein the apparatus is further caused to:
    cause, at least in part, a cessation of the transmission of the asset data, the at least one scan response, or a combination thereof based, at least in part, on the modification of the one or more advertising packets.

13. An apparatus of claim 12, wherein the apparatus is further caused to:
    determine at least one identification value associated with the at least one scanning device; and
    process and/or facilitate a processing of the at least one identification value to determine whether the at least one scanning device is known to the at least one tag,
    wherein the identification criteria is based, at least in part, on the at least one identification value.

14. An apparatus of claim 11, wherein the apparatus is further caused to:
    determine at least one scan request from the at least one scanning device based, at least in part, on a known identification value; and
    process and/or facilitate a processing of the at least one scan request to cause, at least in part, a reset of the counter value associated with the one or more advertising packets,
    wherein the identification criteria is based, at least in part, on the at least one scan request.

15. An apparatus of claim 11, wherein the apparatus is further caused to:
    cause, at least in part, a transmission of the one or more advertising packets on a periodic basis; and cause, at least in part, a modification of the periodic basis based, at least in part, on a change of the counter value, an absence of at least one identification value, or a combination thereof.

16. An apparatus of claim 14, wherein the apparatus is further caused to:
process and/or facilitate a processing of the at least one scan request to decode the request; and
cause, at least in part, a transmission of the at least one scan response based, at least in part, on the at least one scan request,
wherein the at least one scan request and the at least one scan response constitute an encrypted pairing.

17. An apparatus of claim 14, wherein the apparatus is further caused to:
cause, at least in part, a reset of the counter value based, at least in part, on a time period, a maximum value, or a combination thereof.

18. An apparatus of claim 11, wherein one or more communications between the at least one tag and the at least one scanning device are based, at least in part, on one or more short-range communication technologies including, at least in part, Bluetooth Low Energy.

19. An apparatus of claim 11, wherein the one or more advertising packets are non-connectable.

20. An apparatus of claim 11, wherein the asset data includes, at least in part, one or more product identifications, a company identification, or a combination thereof.

* * * * *